(No Model.)

S. H. RAYMOND.
DEVICE FOR TURNING EGGS.

No. 359,327. Patented Mar. 15, 1887.

UNITED STATES PATENT OFFICE.

SILAS H. RAYMOND, OF GRAND RAPIDS, MICHIGAN.

DEVICE FOR TURNING EGGS.

SPECIFICATION forming part of Letters Patent No. 359,327, dated March 15, 1887.

Application filed October 23, 1886. Serial No. 217,066. (No model.)

*To all whom it may concern:*

Be it known that I, SILAS H. RAYMOND, a citizen of the United States, residing at Grand Rapids, in the county of Kent and State of Michigan, have invented certain new and useful Improvements in Egg-Preservers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
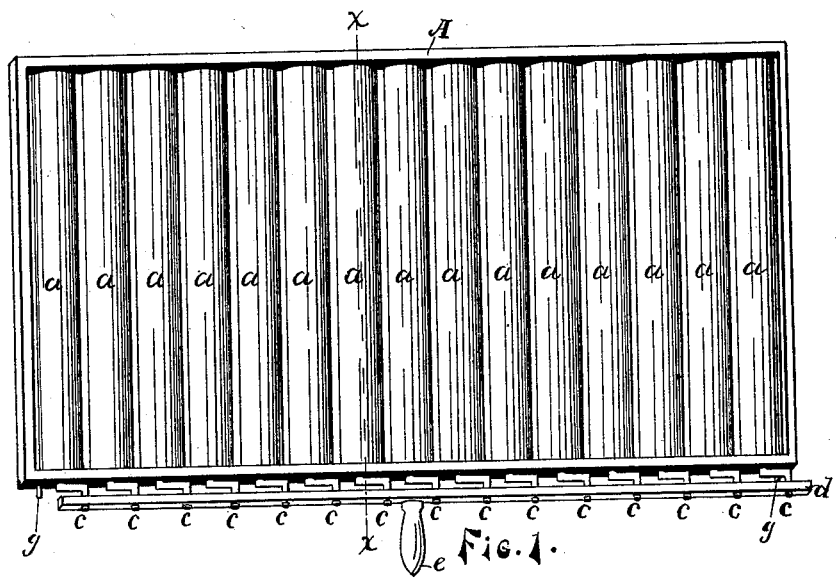
Figure 2:

Figure 1 is a plan view of my invention. Fig. 2 is a sectional view on the line $x$ $x$ of Fig. 1.

Similar letters refer to similar parts.

My invention relates to that class of egg-preservers wherein rollers are used upon which the eggs turn as the rollers revolve.

The object of my invention is to furnish a device wherein the rollers are so adjusted that they all turn in unison and without possibility of failure.

I describe my invention as follows:

A is the frame, in which are journaled the rollers $a$ $a$ upon the trunnions $f f$. Said trunnions, on one side, project through the frame A, and are bent in crank shape, (shown as $c$ $c$,) and pass through the connecting-rod $d$, whereto they are suitably fastened. Said connecting-rod is provided with the handle $e$, while the stops $g$ $g$ are so placed as to allow of but a semi-revolution of the rollers $a$ $a$. Said rollers should preferably be about one and one-half inch in diameter, the average diameter of eggs.

It will be seen that eggs placed upon the rollers $a$ $a$ will, by the operation of the connecting-rod $d$, be turned one-half over in unison with the rollers, and that each roller must invariably turn as far as the rest.

I am aware of the patent of E. S. Renwick, No. 224,224, dated February 3, 1880, in which a series of rollers are journaled in a frame and connected by flexible straps or bands, one of said rollers being extended beyond the frame and provided with a crank for the simultaneous turning of all the rollers; but my invention differs from this construction in that the trunnions at one end of the rollers are extended beyond the frame and formed with cranks, each pivotally connected with a rod having a handle, and in that I employ stop-pins to limit the movement of said rod, so that the rollers are only partially turned.

Having thus described my invention, what I claim, and desire to secure by Letters Patent, is—

The combination, with a frame, of rollers formed with trunnions bearing in the frame, said trunnions being extended at one end and formed with crank-arms, a rod or bar having a handle and connected with said crank-arms, and stop-pins projecting from the frame and adapted to be engaged by said bar or rod, substantially as set forth.

In testimony whereof I affix my signature in presence of two witnesses.

SILAS H. RAYMOND.

Witnesses:
ADOLPH B. MASON,
WILLIAM A. CHAPMAN.